(12) United States Patent
Park et al.

(10) Patent No.: US 10,791,530 B2
(45) Date of Patent: Sep. 29, 2020

(54) METHOD AND DEVICE FOR TRANSMITTING/RECEIVING SYNCHRONIZATION SIGNAL AND SYSTEM INFORMATION FOR TERMINAL IN NEW WIRELESS ACCESS NETWORK

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/316,774

(22) PCT Filed: Jul. 12, 2017

(86) PCT No.: PCT/KR2017/007466
§ 371 (c)(1),
(2) Date: Jan. 10, 2019

(87) PCT Pub. No.: WO2018/012878
PCT Pub. Date: Jan. 18, 2018

(65) Prior Publication Data
US 2019/0306819 A1   Oct. 3, 2019

(30) Foreign Application Priority Data

Jul. 15, 2016  (KR) .................. 10-2016-0089972
Jul. 11, 2017  (KR) .................. 10-2017-0087597

(51) Int. Cl.
*H04W 56/00* (2009.01)
*H04B 7/26* (2006.01)
(Continued)

(52) U.S. Cl.
CPC ...... *H04W 56/0015* (2013.01); *H04B 7/2615* (2013.01); *H04L 5/0094* (2013.01); *H04W 72/0453* (2013.01); *H04W 80/08* (2013.01)

(58) Field of Classification Search
None
See application file for complete search history.

(56) References Cited

U.S. PATENT DOCUMENTS

2008/0205351 A1   8/2008  Lindoff et al.
2009/0304100 A1  12/2009  Brehler et al.
(Continued)

FOREIGN PATENT DOCUMENTS

KR   10-2011-0027775 A   3/2011
KR   10-2011-0102876 A   9/2011

OTHER PUBLICATIONS

Intel Corporation, "Forward compatibility for new radio interface", R1-162381, 3GPP TSG RAN WG1 Meeting #84bis, Busan, Korea, Apr. 11-15, 2016, pp. 1-3.
(Continued)

*Primary Examiner* — Hong S Cho
(74) *Attorney, Agent, or Firm* — IP Legal Services, LLC (57) ABSTRACT

Provided is a flexible numerology configuration method for an NR. In particular, a method may be provided for transmitting a synchronization signal and system information for a user equipment in a new radio access network. The method may include defining one or more subcarrier spacings to transmit at least one synchronization signal and at least one system information transmission channel in a frequency band of the new radio access network, determining one of the one or more subcarrier spacings to transmit the at least one synchronization signal and the at least one system information transmission channel, and transmitting at least one of the at least one synchronization signal and the at least
(Continued)

one system information transmission channel based on the determined subcarrier spacing.

12 Claims, 8 Drawing Sheets

(51) Int. Cl.
*H04L 5/00* (2006.01)
*H04W 72/04* (2009.01)
*H04W 80/08* (2009.01)

(56) References Cited

U.S. PATENT DOCUMENTS

| | | |
|---|---|---|
| 2011/0267996 A1 | 11/2011 | Guan et al. |
| 2015/0131560 A1 | 5/2015 | Von Elbwart et al. |
| 2015/0256308 A1 | 9/2015 | Ma et al. |
| 2016/0191216 A1 | 6/2016 | Ma et al. |
| 2017/0099655 A1 | 4/2017 | Golitschek Edler Von Elbwart et al. |
| 2017/0359791 A1* | 12/2017 | Onggosanusi ........ H04L 5/0023 |
| 2018/0234216 A1 | 8/2018 | Ma et al. |
| 2018/0241519 A1 | 8/2018 | Ma et al. |
| 2018/0270027 A1 | 9/2018 | Ma et al. |
| 2018/0376436 A1* | 12/2018 | Wolff ..................... H04L 5/001 |
| 2019/0182013 A1* | 6/2019 | Onggosanusi ........ H04B 7/0626 |
| 2019/0320397 A1* | 10/2019 | Tang ..................... H04L 5/0094 |

OTHER PUBLICATIONS

Samsung, "Framework for multiplexing verticals in NR", R1-164001, 3GPP TSG RAN WG1 #85, Nanjing, China May 23-27, 2016, pp. 1-4.

Samsung, "Proposed set of numerologies for NR", R1-163998, 3GPP TSG RAN WG1 #85, Nanjing, China May 23-27, 2016, pp. 1-4.

European Patent Office, European Search Report of corresponding EP Patent Application No. 17827948.5, dated Dec. 20, 2019.

* cited by examiner

METHOD AND DEVICE FOR TRANSMITTING/RECEIVING SYNCHRONIZATION SIGNAL AND SYSTEM INFORMATION FOR TERMINAL IN NEW WIRELESS ACCESS NETWORK

CROSS REFERENCE TO RELATED APPLICATIONS

This application is a National Stage Patent Application of PCT International Patent Application No. PCT/KR2017/007466 (filed on Jul. 12, 2017) under 35 U.S.C. § 371, which claims priority to Korean Patent Application Nos. 10-2016-0089972 (filed on Jul. 15, 2016) and 10-2017-0087597 (filed on Jul. 11, 2017), the teachings of which are incorporated herein in their entireties by reference.

TECHNICAL FIELD

The present disclosure relates to a frame structure for a next-generation/5G radio access network (hereinafter, referred to as a new radio (NR)) and a method of transmitting or receiving a synchronization signal and system information in the NR.

DESCRIPTION OF THE RELATED ART

Recently, the 3rd generation partnership project (3GPP) has approved the "Study on New Radio Access Technology", which is a study item for research on next-generation/5G radio access technology. On the basis of such a study item, Radio Access Network Working Group 1 (RAN WG1) has been discussing frame structures, channel coding and modulation, waveforms, multiple access methods, and the like for a new radio (NR).

The NR is required to be designed not only to provide an improved data transmission rate as compared with that of long-term evolution (LTE)/LTE-Advanced, but also to meet various requirements for each detailed and specific usage scenario.

Enhanced mobile broadband (eMBB), massive machine-type communication (mMTC), and ultra reliable and low latency communication (URLLC) are introduced as representative usage scenarios in the NR. It is necessary for flexible frame structures compared with the LTE/LTE-Advanced to be designed to meet the requirements of the respective usage scenarios.

In particular, there is necessity for designing resource allocation structures differently from one another for each usage scenario, and it is also necessary for effectively designing a frame structure and physical signals/channels thereof for efficiently supporting a NR user equipment operating under resource allocation structures differently designed from one another through one NR frequency band.

DETAILED DESCRIPTION OF THE INVENTION

Technical Problem

It is an objective of the present disclosure is to provide a frame structure capable of supporting various usage scenarios in the NR and a method of performing operations to transmit and/or receive a synchronization signal and system information, between a base station and a user equipment, in one NR frequency band.

Technical Solution

In accordance with an aspect of the present disclosure, a method may be provided for transmitting a synchronization signal and system information for a user equipment in the NR. The method may include defining one or more subcarrier spacings to transmit at least one synchronization signal and at least one system information transmission channel in a frequency band of the NR, determining one of the one or more subcarrier spacings to transmit the at least one synchronization signal and the at least one system information transmission channel, and transmitting at least one of the at least one synchronization signal and the at least one system information transmission channel based on the determined subcarrier spacing.

In accordance with another aspect of the present disclosure, a method may be provided for receiving a synchronization signal and system information for a user equipment in the NR. The method may include identifying one or more subcarrier spacings defined to transmit at least one synchronization signal and at least one system information transmission channel in a frequency band of the NR, estimating one subcarrier spacing through which the at least one synchronization signal and the at least one system information transmission channel are transmitted among the one or more subcarrier spacings, and receiving at least one of the at least one synchronization signal and the at least one system information transmission channel based on the estimated subcarrier spacing.

In accordance with further another aspect of the present disclosure, a base station may be provided for transmitting a synchronization signal and system information. The base station may include a controller configured to define one or more subcarrier spacings to transmit at least one synchronization signal and at least one system information transmission channel in a frequency band of the NR, determine one of the one or more subcarrier spacings to transmit the at least one synchronization signal and the at least one system information transmission channel, and a transmitter configured to transmit at least one of the at least one synchronization signal and the at least one system information transmission channel based on the determined subcarrier spacing.

In accordance with yet another aspect of the present disclosure, a user equipment may be provided for receiving a synchronization signal and system information in the NR. The user equipment may include a controller configured to identify one or more subcarrier spacings defined to transmit at least one synchronization signal and at least one system information transmission channel in a frequency band of the NR, estimate one subcarrier spacing through which the at least one synchronization signal and the at least one system information transmission channel are transmitted among the one or more subcarrier spacings, and a receiver configured to receive at least one of the at least one synchronization signal and the at least one system information transmission channel based on the estimated subcarrier spacing.

Advantageous Effects

According to the embodiments of the present disclosure, a frame structure may be defined for supporting various usage scenarios in the NR, and a base station and a user equipment may be enabled to transmit and receive a synchronization signal and system information in one NR frequency band.

MODE FOR CARRYING OUT THE INVENTION

Hereinafter, the present preferred embodiments of the disclosure will be described in detail with reference to the accompanying drawings. In denoting elements of the drawings by reference numerals, the same elements will be referenced by the same reference numerals although the elements are illustrated in different drawings. In the following description of the disclosure, detailed description of known functions and configurations incorporated herein may be omitted when it may make the subject matter of the disclosure rather unclear.

In the present disclosure, a wireless communication system refers to a system for providing various communication services such as a voice communication service, a packet data service, etc. The wireless communication system includes a user equipment (UE) and a base station (BS).

In the present disclosure, the UE is defined as a generic term including devices used in wireless communication. Therefore, the UE may include i) UEs in wideband code division multiple access (WCDMA), long term evolution (LTE), high speed packet access (HSPA), international mobile telecommunications (IMT)-2020 (5G or new radio) and ii) a mobile station (MS) in global system for mobile communications (GSM), a user terminal (UT), a subscriber station (SS), a wireless device, or the like.

The BS or a cell generally refers to a station communicating with the UE. In the present disclosure, the BS or cell is defined as a generic term including all of various coverage areas, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), a small cell, or the like.

Since each of the above-described various cells is controlled by a BS, therefore the BS may be classified into two categories. That is, the BS may be referred to 1) an apparatus that provides a megacell, a macrocell, a microcell, a picocell, a femtocell, and a small cell, as a radio coverage area, or 2) the radio coverage area itself. In 1), the BS may be referred to any or all apparatuses providing radio coverage area by being controlled by one identical entity or by cooperating with each other. According to a method of establishing a radio coverage area, the BS may be a point, a transmission/reception point, a transmission point, a reception point, or the like. In 2), the BS may be a radio coverage area itself for transmitting or receiving a signal from UE perspective or neighboring BS perspective.

In the present disclosure, the cell may refer to a coverage of a signal transmitted from a transmission point or a transmission/reception point, a component carrier having the coverage of the signal transmitted from the transmission point or the transmission/reception point, or the transmission/reception point itself.

In the present disclosure, the UE and the BS are entities performing uplink or downlink operation used to embody the technology and technical conceptions described in the present disclosure. The UE and the BS are defined as a generic term and not limited to specific terms or words.

The uplink (UL) refers to a data transmission/reception scheme by a UE to/from a BS, and the downlink (DL) refers to a data transmission/reception scheme by a BS to/from a UE.

Uplink transmission and downlink transmission may be performed based on i) a time division duplex (TDD) technique performing the transmission through different time slots, ii) a frequency division duplex (FDD) technique performing the transmission through different frequencies, or iii) a hybrid technique of the FDD and TDD.

Further, in some wireless communication systems, a related standard specification defines an UL and a DL to be established based on a single carrier or a pair of carriers.

The UL and/or DL may include control channels for transmitting control information. Such control channels may include a physical DL control channel (PDCCH), a physical UL control channel (PUCCH), or the like. Furthermore, the UL and/or DL may include data channels for transmitting data. Such data channel may include a physical DL shared channel (PDSCH), a physical UL shared channel (PUSCH), or the like.

The DL may denote communication or a communication path from multiple transmission/reception points to a UE, and the UL may denote communication or a communication path from the UE to the multiple transmission/reception points. In the DL, a transmitter may be a part of multiple transmission/reception points, and a receiver may be a part of the UE. In the UL, a transmitter may be a part of the UE and a receiver may be a part of multiple transmission/reception points.

Hereinafter, transmission and reception of a signal through a channel such as the PUCCH, the PUSCH, the PDCCH, or the PDSCH, may be described as the transmission and reception of the PUCCH, the PUSCH, the PDCCH, or the PDSCH.

Meanwhile, higher layer signaling includes radio resource control (RRC) signaling transmitting RRC information containing an RRC parameter.

The BS performs DL transmission to the UE. The BS may transmit a physical DL control channel for transmitting i) DL control information such as scheduling required to receive a DL data channel that is a primary physical channel for unicast transmission and ii) scheduling approval information for transmission through an UL data channel. Hereinafter, transmission and reception of a signal through each channel will be described as transmission and reception of a corresponding channel.

Any of multiple access techniques may be applied to wireless communication systems according to the present disclosure, and therefore no limitation is imposed on them. Various multiple access techniques may include time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

Some embodiments of the present disclosure may be applied to resource allocation in as well as asynchronous wireless communication evolving into LTE/LTE-advanced and IMT-2020 beyond GSM, WCDMA, and HSPA, synchronous wireless communication evolving into CDMA, CDMA-2000, and UMB.

In the present disclosure, a machine type communication (MTC) device may refer to a device that supports low cost (or low complexity), a device that supports coverage enhancement, or the like. The MTC device may refer to a device defined in a predetermined category for supporting low costs (or low complexity) and/or coverage enhancement.

In other words, the MTC device may refer to a low cost (or low complexity) UE category/type newly defined in 3GPP Release-13 and performing LTE-based MTC-related operations. The MTC device may refer to a UE category/type defined in or before 3GPP Release-12 supporting enhanced coverage in comparison with the typical LTE coverage or supporting low power consumption, or may refer to a low cost (or low complexity) UE category/type newly defined in Release-13. The MTC device may refer to a further enhanced MTC device defined in Release-14.

In the present disclosure, a narrowband Internet of Things (NB-IoT) device refers to a UE supporting radio access for cellular IoT. NB-IoT technology is aimed at indoor coverage improvement, support for large-scale low-speed devices, low latency sensitivity, very low device costs, low power consumption, and optimized network architecture.

Enhanced mobile broadband (eMBB), massive machine-type communication (mMTC), and ultra reliable and low latency communication (URLLC) are proposed as representative usage scenarios in IMT-2020 having been discussed in the 3GPP recently.

New Radio (NR)

Recently, the 3rd generation partnership project (3GPP) has approved the "Study on New Radio Access Technology", which is a study item for research on next-generation/5G radio access technology. On the basis of such a study item, Radio Access Network Working Group 1 (RAN WG1) has started discussions on frame structures, channel coding and modulation, waveforms, multiple access techniques, and the like for a new radio (NR).

The NR is required to be designed not only to provide an improved data transmission rate as compared with that of the LTE, but also to meet various requirements for each detailed and specific usage scenario.

In particular, the eMBB, mMTC, and URLLC are introduced as representative usage scenarios of the NR. It is necessary to design more flexible frame structures compared with that of the LTE for satisfying the requirements of the respective usage scenarios.

In addition, there is a necessity for designing resource allocation structures different from one another for each usage scenario, and, as a method to support this, there is growing sympathy for the necessity of multiplexing between numerologies different from one another through one NR frequency band.

That is, it is necessary to effectively design a frame structure and physical signals/channels thereof for effectively supporting NR UEs that operate under resource allocation units different from one another based on different subcarrier spacings and different transmission time interval (TTI) structures for each usage scenario or deployment scenario through one NR frequency band.

The present disclosure introduces a method of configuring a flexible numerology for the NR according to embodiments. In particular, the present disclosure proposes numerology configuration and related operations of a UE and a BS for supporting transmission and/or reception operations performed based on different numerologies (e.g., subcarrier spacings (SCS), subframes, transmission time intervals (TTI), etc.) through one NR frequency band in order to satisfy requirements of different usage scenarios and deployment scenarios.

As described above, the eMBB, mMTC, URLLC are considered as representative usage scenarios of the NR being discussed in the 3GPP. Since each usage scenario imposes different requirements for data rates, latency, coverage, etc., there is necessity for developing a method of efficiently multiplexing radio resource units based on different numerologies (e.g., subcarrier spacings (SCS), subframes, transmission time intervals (TTI), etc.), as a method to efficiently satisfy requirements for each usage scenario through a frequency band configuring an arbitrary NR system.

For example, like the LTE, there is the necessity of supporting through one NR frequency band i) a 1 ms subframe (or TTI) structure based on a 15 kHz subcarrier spacing, ii) a 0.5 ms subframe (or TTI) structure based on a 30 kHz subcarrier spacing, and iii) a 0.25 ms subframe (or TTI) structure based on a 60 kHz subcarrier spacing.

The present disclosure also introduces a method for effectively supporting a plurality of numerologies each having different subcarrier spacings and subframe (or TTI) lengths through one NR frequency band.

To describe some embodiments of the present disclosure, numerology types comprised of each set of a subcarrier spacing and a subframe (or TTI) length are identified as N1, N2, N3, . . . .

For example, N1 is defined as one numerology type having a 1ms subframe (or TTI) structure based on a 15 kHz subcarrier spacing, and N2 is defined as another numerology type having a 0.5 ms subframe (or TTI) structure based on a 30 kHz subcarrier spacing, and N3 is defined as further another numerology type having 0.25 ms subframe (or TTI) structure based on a 60 kHz subcarrier spacing.

Embodiments of the present disclosure are not limited to the number of numerology types, and specific values of subcarrier spacings and subframe (or TTI) lengths constituting each numerology type, defined for the NR.

A frequency, a frame, a subframe, a resource, a resource block (RB), a region, a band, a sub-band, a control channel, a data channel, a synchronization signal, various reference signals, various signals, and various messages associated with the NR in the present disclosure may be construed as meanings used in the past or present or as various meanings to be used in the future.

Embodiment 1: Definition of Anchor Numerology and UE-Specific Numerology

A frame structure in the NR according to some embodiments of the present disclosure may include an area (e.g., frequency region) configured to transmit common signals for all or a plurality of UEs (anchor numerology) and an area (e.g., region) configured to transmit UE-specific signals (UE-specific numerology).

For example, a NR BS may configure i) an anchor numerology, $N_a$, for commonly transmitting a DL physical signal(s), physical channel(s) and reference signal(s) (RS) for all UEs in the corresponding cell and ii) a set of UE-specific numerologies, $\{N_{UE}, k\}$, for transmitting a UE-specific physical channel(s), physical signal(s) and reference signal(s), etc., to each UE.

Specifically, i) a DL synchronization signal(s) for initial access of UEs in a cell, ii) a DL channel(s) for transmitting system information including cell constitution information, iii) a cell-specific DL reference signal(s) for channel measurement of the UE, and the like are transmitted or received based on one anchor numerology configured in the corresponding cell. Here, the DL channel(s) for transmitting system information includes a broadcasting channel (PBCH), a DL control channel (PDCCH) and a DL data channel PDSCH, or the like. Further, a UE-specific DL radio signal(s) and radio channel(s) are transmitted or received through a UE-specific numerology configured for each UE.

The anchor numerology, $N_a$, may be determined based on a center frequency value of a frequency band of a corresponding NR cell, or a predetermined numerology may be determined as the anchor numerology. As an alternative, the anchor numerology $N_a$ may be configured by a NR BS/cell.

That is, the region of the anchor numerology, $N_a$ may be determined according to the range of the frequency band of the corresponding NR cell, or a specific numerology or a numerology among a plurality of numerologies may be configured as the anchor numerology.

Additionally, a set of UE-specific numerologies, $\{N_{UE}, k\}$, which are configured by an arbitrary NR BS/cell, may be transmitted to UEs in the corresponding cell by cell-specific RRC signaling. A UE-specific numerology(s), $N_{UE}, k$, configured per UE may be configured semi-statically by UE-specific RRC signaling, or may be configured dynamically by L1/L2 control signaling.

Such an anchor numerology or a UE-specific numerology(s) may be configured based on the TDM, the FDM, or the hybrid TDM/FDM.

Hereinafter, referring to FIG. 1 to FIG. 4, methods of configuring an anchor numerology and a UE-specific numerology(s) and methods of transmitting/receiving a synchronization signal and system information for a UE in a corresponding structure will be discussed.

Embodiment 2: Multiplexing Between Anchor Numerology and UE-Specific Numerology Method 1. TDM Based Multiplexing FIG. 1 illustrates a method of configuring an anchor numerology and a UE-specific numerology(s) based on TDM in NR according to some embodiments of the present disclosure.

Figure 1:
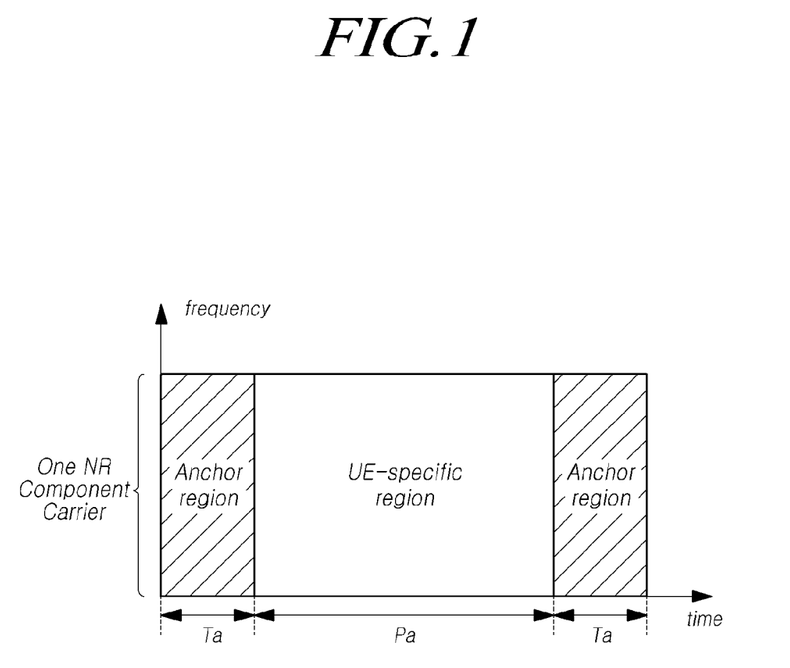
FIG. 1 is a diagram illustrating an exemplary time division multiplexer (TDM) based frame structure for the NR according to some embodiments of the present disclosure.

Referring to FIG. 1, an anchor numerology region is a frequency region for transmitting and receiving a DL physical signal(s)/channel(s) based on the anchor numerology. Such an anchor numerology region is configured to be maintained during an anchor interval, $T_a$ based on a certain period, $P_a$. A UE-specific numerology region is a frequency region for transmitting and receiving a DL physical signal(s)/channel(s) based on the UE-specific numerology(s). Such a UE-specific numerology is configured during the other time interval(s).

In this case, in the UE-specific numerology region, UE-specific numerologies, $N_{UE1}$, $N_{UE2}$, . . . , $N_{UEk}$, in a corresponding NR BS/cell may be configured to be multiplexed in one of a TDM technique, a FDM technique, and a hybrid TDM/FDM technique. As described, each of UE-specific numerologies may be configured differently according to a corresponding UE.

That is, in the NR, the anchor numerology region for transmitting and receiving a synchronization signal for initial access of a UE is configured during a certain interval with a certain period, and the UE-specific numerology region may be configured based on one of a TDM technique, a FDM technique, and a hybrid TDM/FDM technique.

Additionally, the anchor interval, $T_a$ of the anchor numerology region may have a fixed value or be determined by an anchor numerology type, such as a subcarrier spacing and a resultant subframe or TTI length. Likewise, the period, $P_a$, repeating the anchor numerology region may also have a fixed value or be determined based on an anchor numerology type, such as a subcarrier spacing and a subframe or TTI length.

Method 2. TDM Based Multiplexing

Figure 2:
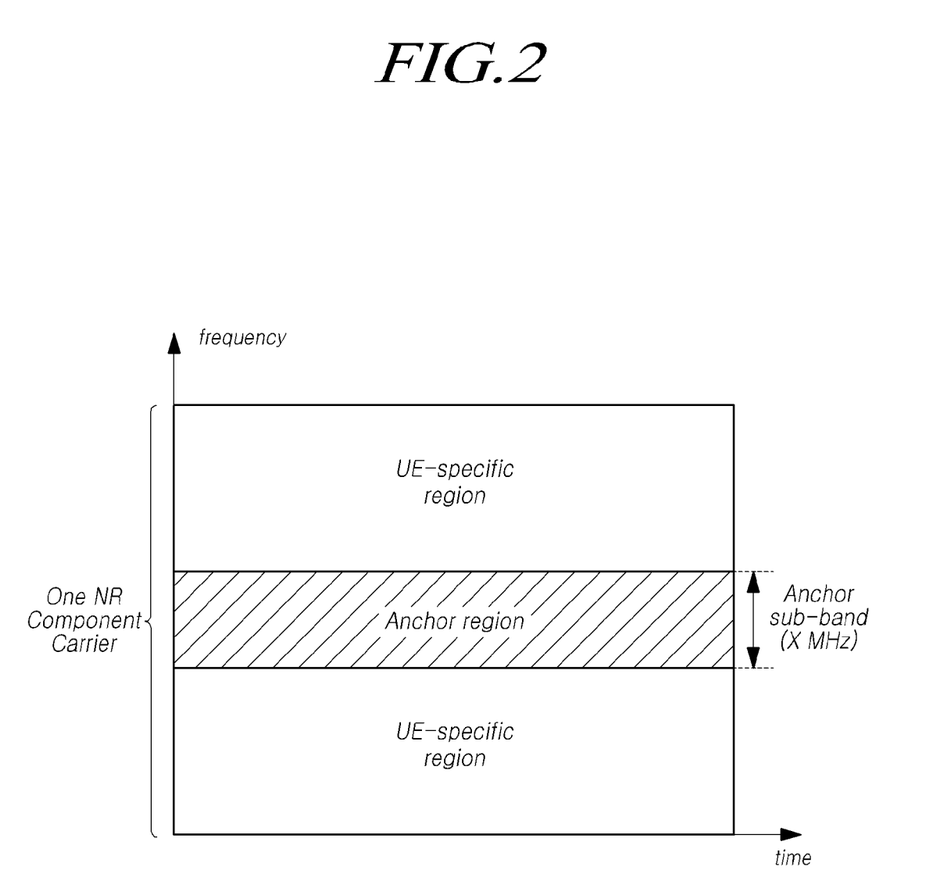
FIG. 2 and FIG. 3 are diagrams illustrating exemplary frequency division multiplexer (FDM) based frame structures for the NR according to some embodiments of the present disclosure.
Figure 3:
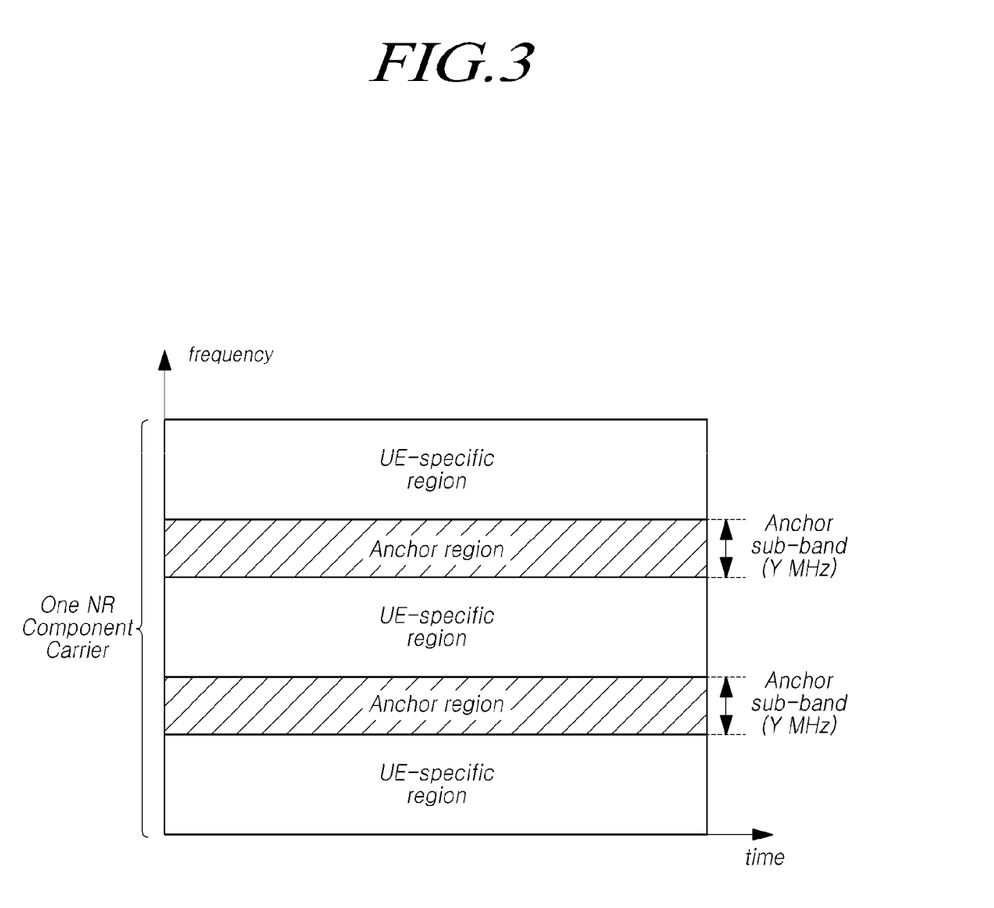

FIG. 2 and FIG. 3 illustrate exemplary methods of configuring an anchor numerology and a UE-specific numerology(s) based on the FDM in the NR according to some embodiments of the present disclosure.

Referring to FIG. 2, an anchor sub-band and UE-specific sub-bands in a NR frequency band may configured by a NR BS/cell, and an anchor numerology region and UE-specific numerology regions may be multiplexed by the FDM technique.

In this case, the anchor sub-band may be configured, in a localized method, to have a center X MHz (or K PRBs) of a NR frequency band configured by the corresponding NR BS/cell.

Further, as illustrated in FIG. 3, anchor sub-bands having a Y MHz (or M PRBs) is distributed in the entire NR system band in a distributed method.

In these cases, the values of X, Y (or K, M) may have fixed values or be determined as a function of a bandwidth of the NR frequency band or a type of the anchor numerology (such as, a subcarrier spacing and a resultant subframe or TTI length).

Additionally, UE-specific numerologies, $N_{UE1}$, $N_{UE2}$, . . . , $N_{UEk}$ may be multiplexed based one of the TDM, the FDM, and the hybrid of TDM and FDM in the corresponding UE-specific frequency. The UE specific numerologies may be configured differently according to each UE by a corresponding NR BS/cell.

Method 3. Hybrid FDM/TDM

Figure 4:
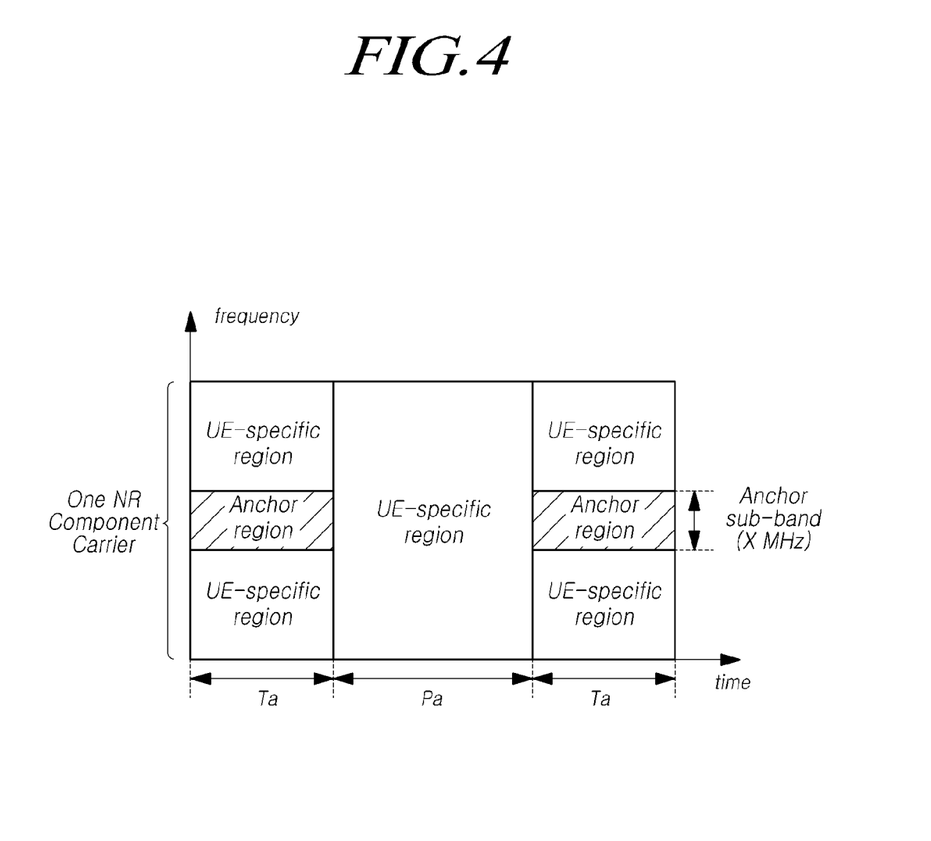
FIG. 4 is a diagram illustrating an exemplary hybrid TDM/FDM based frame structure for the NR according to some embodiments of the present disclosure.

FIG. 4 illustrates an exemplary method of configuring an anchor numerology and a UE-specific numerology based on the TDM/FDM in the NR according to some embodiments of the present disclosure. For example, FIG. 4 shows the anchor numerology and UE-specific numerology configured based on the combination of the above methods 1 and 2.

Referring to FIG. 4, an anchor sub-band described in the Method 2 may be defined within an anchor interval $T_a$ repeated with the period $P_a$ of the Method 1 and the other time interval(s) and frequency intervals are configured to be UE-specific regions.

In this case, the anchor sub-band in the anchor interval may be configured to have a center X MHz (or K PRBs) of a NR frequency band in the localized method, as in the case of FIG. 2 in the Method 2. Further, as in the case of FIG. 3 in the Method 2, anchor sub-bands having an Y MHz (or M PRBs) is distributed in the entire NR system band in a distributed method.

That is, according to this embodiment, the anchor numerology may be configured based on one of the TDM, the FDM, and the hybrid TDM/FDM in the NR, and a common signal (e.g., transmitted commonly to UEs) may be transmitted or received through the anchor numerology region, and a UE-specific signal(s)/channel(s) may be transmitted or received through a UE-specific numerology regions.

In addition, the UE-specific numerology region(s) may be configured with a time-frequency structure different from that of the anchor numerology region, and therefore various usage scenarios may be supported in one NR frequency band.

Figure 5:
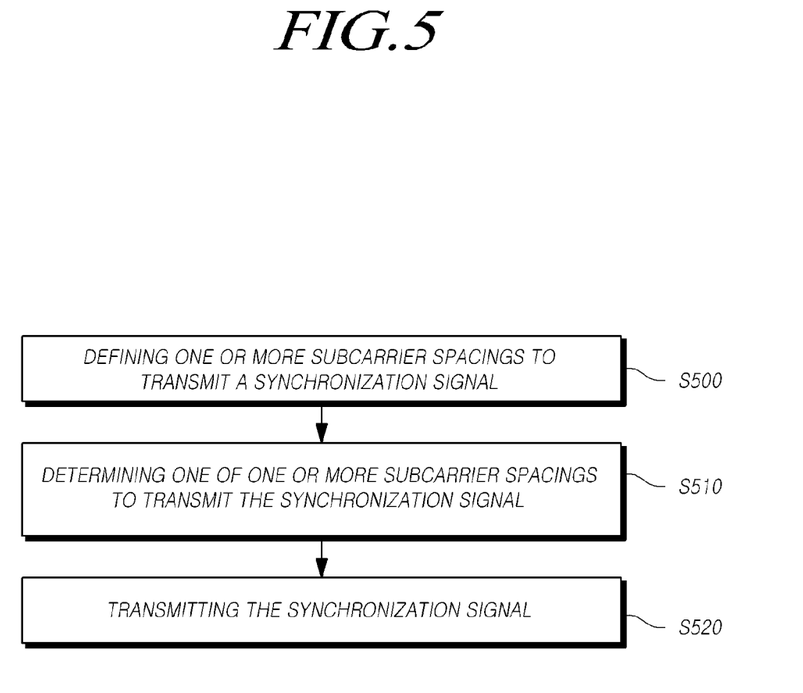
FIG. 5 is a flowchart illustrating a method for transmitting a synchronization signal for initial access of a user equipment in the NR according to some embodiments of the present disclosure.

FIG. 5 is a diagram illustrating a procedure for transmitting a synchronization signal for initial access of a UE in the NR according to some embodiments of the present disclosure.

Referring to FIG. 5, in the NR, a BS defines one or more subcarrier spacings for transmitting at least one synchronization signal (PSS, SSS, PBCH, etc.) for initial access of the UE in a frequency band of the NR S500.

Here, the one or more subcarrier spacings may be determined by a center frequency value of the frequency band of the NR. That is, the one or more subcarrier spacings may be determined based on a frequency band range of the NR.

Further, one subcarrier spacing may be configured to transmit or receive the at least one synchronization signal, or a plurality of subcarrier spacings may be configured by being distributed in the frequency band of the NR.

A frequency area (e.g., frequency region) other than one or more subcarrier spacings configured to transmit at least one synchronization signal may be configured as area frequency region for transmitting or receiving a UE-specific signal/channel. At this time, the region for transmitting or receiving the UE-specific signal/channel may have a time-frequency resource structure other than the one or more subcarrier spacings for transmitting or receiving the at least one synchronization signal.

The BS determines one of the one or more subcarrier spacings to transmit the at least one synchronization signal for initial access of the UE S510.

The BS generates at least one synchronization signal for initial access of the UE based on the determined subcarrier spacing and transmits the generated at least one synchronization signal S520.

Here, the BS may transmit several synchronization signals for initial access of the UE based on the same subcarrier spacing.

As an alternative, the BS may transmit each synchronization signal based on subcarrier spacings different from one another.

That is, in a case where a plurality of subcarrier spacings are configured by being distributed in one NR frequency band, a first synchronization signal (such as, PSS) may be transmitted based on a first subcarrier spacing, and a second synchronization signal (such as, SSS) may be transmitted based on a second subcarrier spacing.

Figure 6:
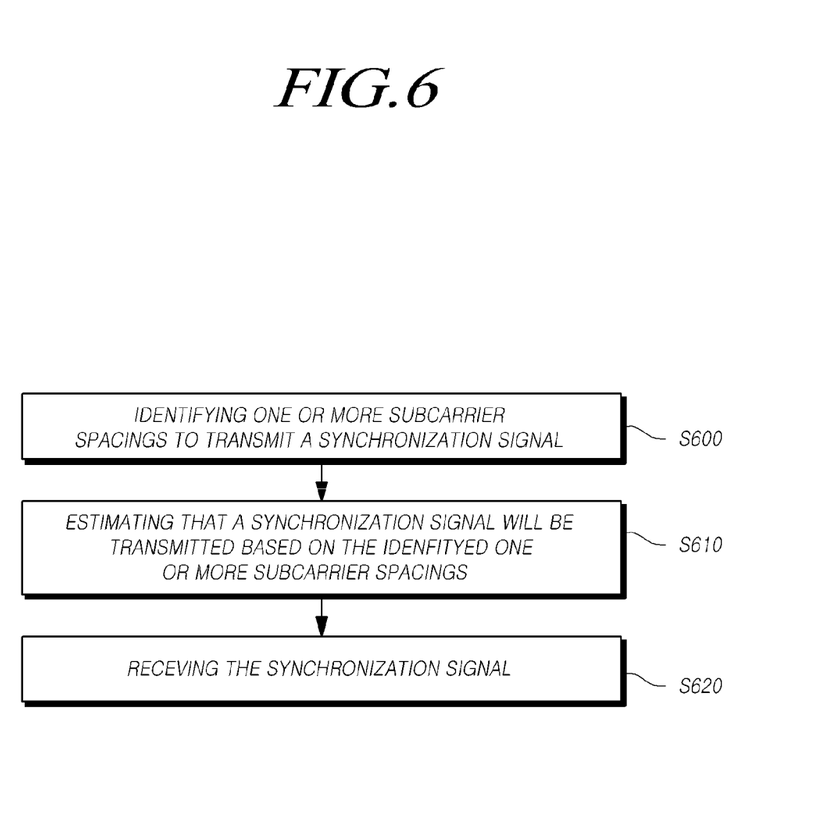
FIG. 6 is a flowchart illustrating a method for receiving a synchronization signal for initial access of a user equipment in the NR according to some embodiments of the present disclosure.

FIG. 6 is a diagram illustrating a procedure for receiving a synchronization signal for initial access by a US in the NR according to some embodiments of the present disclosure.

Referring to FIG. 6, the UE identifies a subcarrier spacing to transmit or receive a synchronization signal for initial access of the UE in a frequency band of the NR S600.

One or more subcarrier spacings to transmit or receive at least one synchronization signal for initial access of the UE may be configured by a BS in a frequency band of the NR.

For example, one or more subcarrier spacings may be determined by a center frequency value of the frequency band of the NR. That is, one or more subcarrier spacings may be defined based on the range of the frequency band of the NR.

In addition, one subcarrier spacing may be configured in the frequency band of the NR, or a plurality of subcarrier spacings may be configured by being distributed in the frequency band of the NR.

The UE estimates that at least one synchronization signal will be transmitted based on one or more subcarrier spacings defined to transmit or receive at least one synchronization signal for initial access of the UE S610, and receives the at least one synchronization signal based on the corresponding one or more subcarrier spacing S620. [99] Here, the UE may receive a plurality of synchronization signals based on one subcarrier spacing. As an alternative, the UE may receive each synchronization signal based on different subcarrier spacings from one another over the plurality of subcarrier spacings. That is, a first synchronization signal (such as, PSS) may be received based on a first subcarrier spacing, and a second synchronization signal (such as, SSS) may be received based on a second subcarrier spacing.

In addition, a UE-specific signal/channel may be received through a region other than the one or more subcarrier spacings configured for transmitting or receiving the at least one synchronization signal.

At this time, the region for transmitting or receiving the UE-specific signal/channel may have a time-frequency resource structure other than the one or more subcarrier spacings for transmitting or receiving the at least one synchronization signal.

According to some embodiments of the present disclosure, a frame structure may be provided for supporting various usage scenarios through one frequency band in the NR required to support several usage scenarios. In addition, specific operating methods may be provided for transmitting or receiving at least one synchronization signal for initial access between the BS and the UE in a frame configured with multiple numerologies.

In addition, the above embodiments may be applied for the transmission or reception of at least one channel through which system information is transmitted. At this time, one or more subcarrier spacings of at least one channel for the transmission or reception of system information which is not transmitted or received through a broadcasting channel (PBCH) may be signaled through the broadcasting channel (PBCH). In addition, a subcarrier spacing for the broadcasting channel (PBCH) and a subcarrier spacing of another channel for transmitting or receiving system information may be the same.

Figure 7:
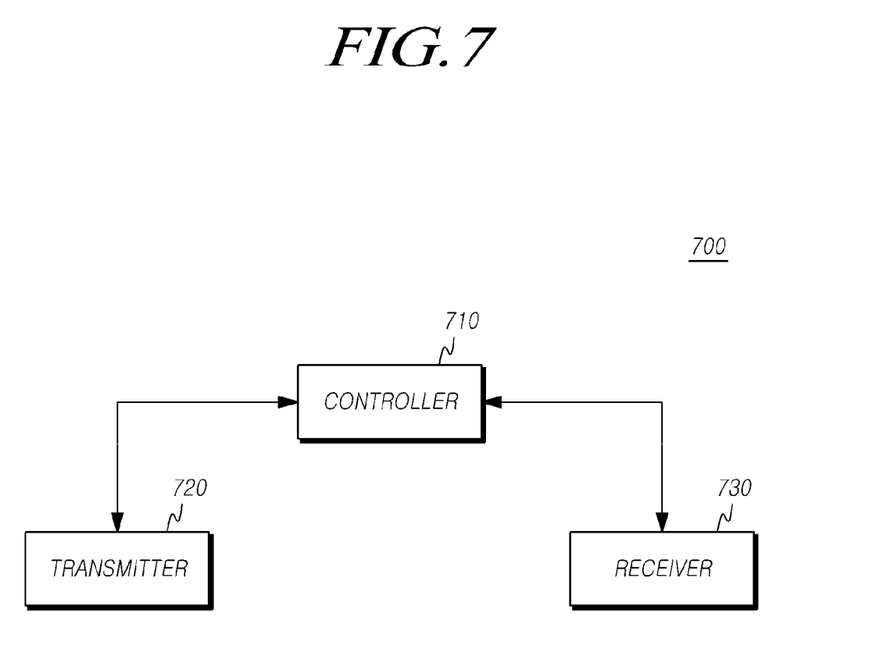
FIG. 7 is a diagram illustrating a base station according to some embodiments of the present disclosure.

FIG. 7 is a diagram illustrating a BS according to some embodiments of the present disclosure.

Referring to FIG. 7, a BS 700 includes a controller 710, a transmitter 720, and a receiver 730.

The controller 710 is configured to control overall operations of the BS 700 for configuring an anchor numerology type and a UE-specific numerology type required to perform the above embodiments of the present disclosure, transmitting or receiving system information through the anchor numerology type, and transmitting or receiving a UE-specific signal through the UE-specific numerology type.

The transmitter 720 and the receiver 730 are configured to transmit and receive signals, messages, and data necessary for carrying out some embodiments as described above, to and from the UE.

Figure 8:
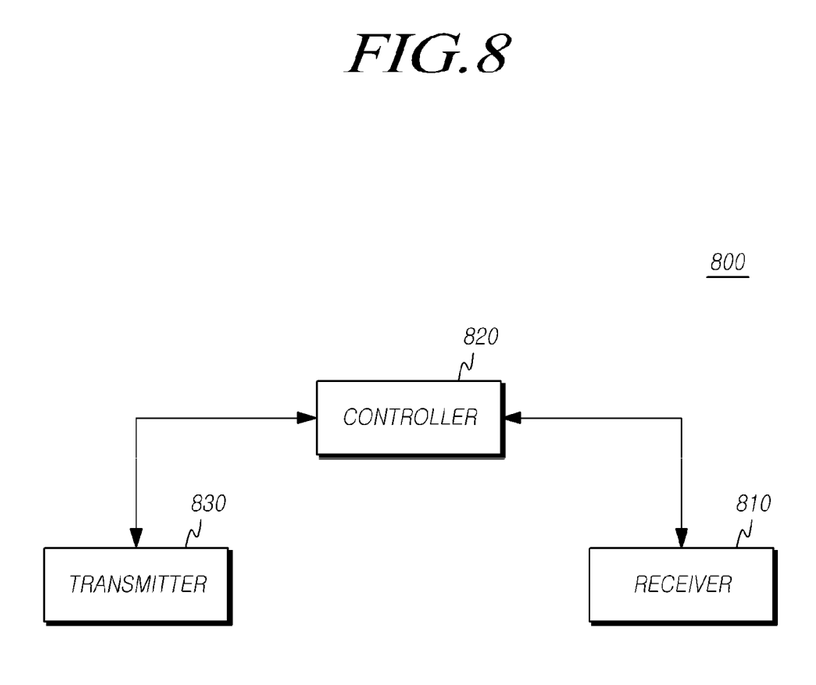
FIG. 8 is a diagram illustrating a user equipment according to some embodiments of the present disclosure.

FIG. 8 illustrates a UE according to some embodiments of the present disclosure.

Referring to FIG. 8, a UE 800 according to some embodiments of the present disclosure includes a receiver 810, a controller 820, and a transmitter 830.

The receiver 810 receives DL control information and data, messages through a corresponding channel from a BS.

The controller 820 is configured to control overall operations of the UE 800, in a state where an anchor numerology type and a UE-specific numerology type required to perform the above embodiments of the present disclosure are configured, for transmitting or receiving system information through the configured anchor numerology type, and transmitting or receiving a UE-specific signal through the UE-specific numerology type.

The transmitter 830 is configured to transmit UL control information and data, messages through a corresponding channel to the BS.

The standardized specifications or standard documents related to the embodiments described above have been omitted in order to simplify the description but constitute a part of the present disclosure. Accordingly, it should be construed that the incorporation of the content of the standardized specifications and part of the standard documents into the detailed description and claims is included within the scope of the present disclosure.

The features, structures, configurations, and effects described in the present disclosure are included in at least one embodiment but are not necessarily limited to a particular embodiment. A person skilled in the art can apply the features, structures, configurations, and effects illustrated in the particular embodiment embodiments to another one or more additional embodiment embodiments by combining or modifying such features, structures, configurations, and effects. It should be understood that all such combinations and modifications are included within the scope of the present disclosure Although the exemplary embodiments have been described for illustrative purposes, a person skilled in the art will appreciate that various modifications and applications are possible without departing from the essential characteristics of the present disclosure. For example, the specific components of the exemplary embodiments may be variously modified. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of transmitting a synchronization signal and system information for a user equipment in a new radio access network, the method comprising:

defining one or more subcarrier spacings to transmit at least one synchronization signal and at least one system information transmission channel in a frequency band of the new radio access network;

determining one of the one or more subcarrier spacings to transmit the at least one synchronization signal and the at least one system information transmission channel; and transmitting at least one of the at least one synchronization signal and the at least one system information transmission channel based on the determined subcarrier spacing, wherein a subcarrier spacing transmitting system information which is not transmitted by a physical broadcasting channel among the at least one system information transmission channel is signaled through the physical broadcasting channel.

2. The method according to claim 1, wherein the one or more subcarrier spacings to transmit the at least one synchronization signal and the at least one system information transmission channel are determined by a range of the frequency band of the new radio access network.

3. The method according to claim 1, wherein a subcarrier spacing transmitting system information which is not transmitted by a physical broadcasting channel among the at least one system information transmission channel is the same as a subcarrier spacing for transmitting the physical broadcasting channel.

4. The method according to claim 1, wherein a user equipment-specific resource allocation structure for transmitting or receiving a user equipment-specific signal and channel is configured by user equipment-specific high layer signaling.

5. A method of receiving a synchronization signal and system information for a user equipment in a new radio access network, the method comprising:

identifying one or more subcarrier spacings defined to transmit at least one synchronization signal and at least one system information transmission channel in a frequency band of the new radio access network;

estimating one subcarrier spacing for transmitting the at least one synchronization signal and the at least one system information transmission channel among the one or more subcarrier spacings; and receiving at least one of the at least one synchronization signal and the at least one system information transmission channel based on the estimated subcarrier spacing, wherein a subcarrier spacing transmitting system information which is not transmitted by a physical broadcasting channel among the at least one system information transmission channel is signaled through the physical broadcasting channel.

6. The method according to claim 5, wherein the one or more subcarrier spacings to transmit the at least one synchronization signal and the at least one system information transmission channel are determined by a range of the frequency band of the new radio access network.

7. The method according to claim 5, wherein a subcarrier spacing transmitting system information which is not transmitted by a physical broadcasting channel among the at least one system information transmission channel is the same as a subcarrier spacing for transmitting physical broadcasting channel.

8. The method according to claim 5, wherein a user equipment-specific resource allocation structure for transmitting or receiving a user equipment-specific signal and channel is configured by user equipment-specific high layer signaling.

9. A base station for transmitting a synchronization signal and system information for a user equipment in a new radio access network, the base station comprising:
- a controller configured to define one or more subcarrier spacings to transmit at least one synchronization signal and at least one system information transmission channel in a frequency band of the new radio access network, and determine one of the one or more subcarrier spacings to transmit the at least one synchronization signal and the at least one system information transmission channel; and
- a transmitter configured to transmit at least one of the at least one synchronization signal and the at least one system information transmission channel based on the determined subcarrier spacing,
- wherein a subcarrier spacing transmitting system information which is not transmitted by a physical broadcasting channel among the at least one system information transmission channel is signaled through the physical broadcasting channel.

10. The base station according to claim 9, wherein the one or more subcarrier spacings to transmit the at least one synchronization signal and the at least one system information transmission channel are determined by a range of the frequency band of the new radio access network.

11. The base station according to claim 9, wherein a subcarrier spacing transmitting system information which is not transmitted by a physical broadcasting channel among the at least one system information transmission channel is the same as a subcarrier spacing for transmitting the physical broadcasting channel.

12. The base station according to claim 9, wherein a user equipment-specific resource allocation structure for transmitting or receiving a user equipment-specific signal and channel is configured by user equipment-specific high layer signaling.

\* \* \* \* \*